Feb. 20, 1962  P. A. DLUGOSCH  3,021,908
FARM IMPLEMENT TRANSPORT CARRIER
Filed Jan. 3, 1958  2 Sheets-Sheet 1

INVENTOR.
PAUL A. DLUGOSCH
BY Rudolph L. Lowell
ATTORNEY

INVENTOR.
PAUL A. DLUGOSCH
BY
ATTORNEY

United States Patent Office 3,021,908
Patented Feb. 20, 1962

3,021,908
FARM IMPLEMENT TRANSPORT CARRIER
Paul A. Dlugosch, Storm Lake, Iowa, assignor to Noble Manufacturing Company, Sac City, Iowa, a corporation of Iowa
Filed Jan. 3, 1958, Ser. No. 707,053
1 Claim. (Cl. 172—466)

This invention relates to agricultural implements and more particularly to a carrier assembly for attachment between a prime mover, such as a tractor, and an earth working implement.

With an ever increasing tractor pulling power being provided by tractor manufacturers, the farmer has found that such power may be well utilized by pulling big hitches of such implements as rotary hoes, and spike and spring-tooth harrows. It is, for example, not uncommon for a farmer to hitch seven six-foot sections of spike-tooth harrows in a row, thus working a 42-foot wide strip of ground.

Such an advantageous use of the tractor pulling power is beset, however, by a number of problems during field and transport operations, examples of such problems being the manual loading and handling of implements, preparing the implements for transport, and turning, crossing waterways, and cleaning out trash during field operations.

It is, therefore, an object of this invention to provide a tractor-towed carrier assembly adapted for easy and quick detachable connection to an earth working implement for pulling, lifting and transporting the implement.

Another object of this invention is to provide a tractor-towed carrier assembly wherein the frame, adapted for detachable connection to an earth working implement, is vertically adjustable relative to the ground surface.

A further object of this invention is to provide a tractor-towed carrier assembly for detachable connection to an earth working implement, wherein the carrier assembly includes a hydraulic device operable by the tractor hydraulic system for lifting the complete implement from a ground engaging position to varied heights thereover for field and transportation purposes by mechanically adjustable means.

Yet another object of this invention is to provide a tractor-towed carrier assembly capable of attaining the above mentioned objects which is economically manufactured, simple and rugged of structure, and efficient in operation.

These and other objects will be readily apparent to those skilled in the art upon reference to the following description and the accompanying drawings, in which.

Figure 1:
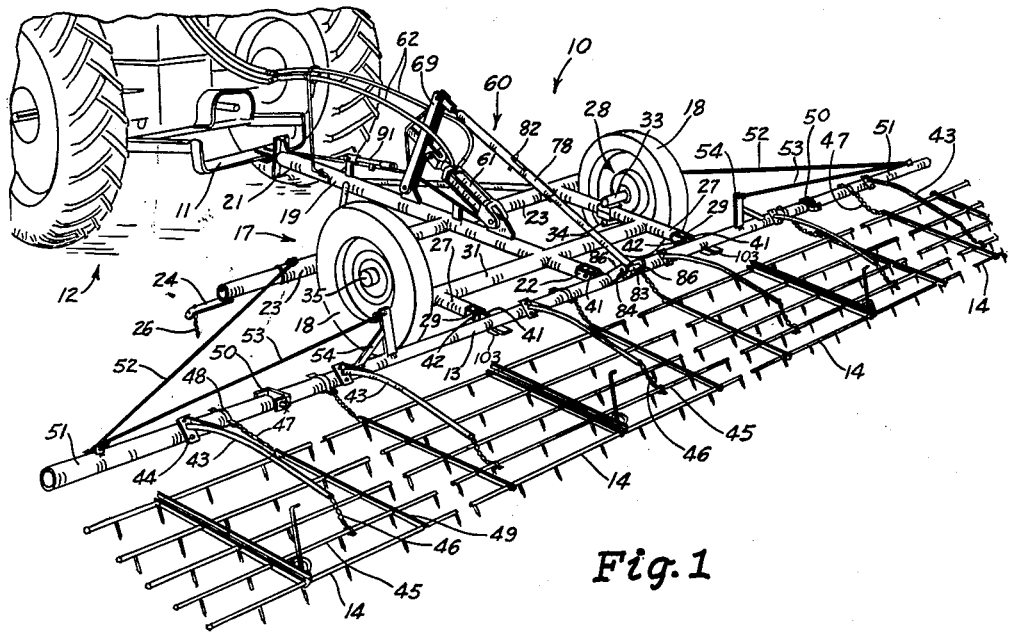
FIG. 1 is a fragmentary left rear perspective view showing the transport carrier of this invention in towed relation to a tractor and attached to a multi-section spike tooth harrow.

Referring now to the drawings, and particularly to FIG. 1, a transport carrier assembly, indicated generally at 10, is connected in towed relation at its forward end to a hitch unit 11 of a conventional tractor 12, the tractor including a usual hydraulic power means (not shown). The rear of the transport carrier 10 is detachably connected to a drawbar 13 to which one or more sections 14 of an earth working implement, such as a spike tooth harrow, are removably attached.

The transport carrier assembly 10 (FIGS. 1 and 2) comprises a frame 17 mounted on ground engaging wheels 18 and includes a longitudinally extended center member 19, preferably of tubular steel. A hitch support unit 21 is secured to the forward end of the center member 19, and a connecting yoke 22 is secured at the rear end of the center member 19. For convenience, forward and rear connotes toward and away from, respectively, the tractor 12. A tubular front member 23 extends laterally from each side of the center member to a position in front of and beyond each wheel 18, and has a stop member 24 (FIG. 1) (only one showing) at each end thereof. A chain 26 is secured to the outer end of each stop member for a hereinafter described purpose.

A transversely spaced pair of tubular side members 27—27 extend rearwardly of the front member 23, whereby each side member 27 is adjacent the inside of a wheel 18. An axle supporting unit 28 is mounted on each side member and a connecting yoke 29 is secured at the rear end of each side member 27. The yokes 22, 29, 29 are transversely aligned. A pair of rod members 30 (FIG. 2) each extend rearwardly from a forward portion of the center member 19 and are secured to the front member 23 adjacent the connection thereto of a side member 27. A tubular rear member 31 extends laterally from each side of the center member 19 and is connected at each outer end thereof to a side member 27, the rear member 31 being spaced rearwardly of and parallel to the front member 23.

Each axle supporting unit 28 includes a pair of clamping plates 32 secured to the upper and lower portions, respectively, of a side member 27, and a pair of tubular axle housings 33—34. The housing 33 is secured to an upper clamping plate 32, and the housing 34 is secured to the lower clamping plate 32 in vertical alignment with the upper housing 33, each housing 33 and 34 adaptable for transverse alignment with the wheel axle 35. By this arrangement, it may be seen that the frame 17 may be adjustably mounted to the wheel axle for positioning the frame 17 at two different heights above the ground surface.

To connect the transport carrier 10 to the tractor 12, the hitch unit 21, which includes a plate unit 36 having a plurality of vertically spaced openings 37 (FIG. 3) formed therein, is secured to the tractor hitch unit 11 by inserting a connecting pin 38 through any one of the openings 37 and the hitch unit 11. Depending on which type of implement is to be drawn, the frame 17 is then mounted on the axles 35 of the wheels 18. For example, should a spring or spike tooth harrow be used, the upper axle housings 33 would be telescopically mounted to the wheel axles 35. However, should a rotary hoe be used, as it is desired to carry the rotary hoe drawbar higher off the ground than either type of harrow, the lower axle housings 34 are mounted to the wheel axle 35, whereby to raise the frame 17.

Figure 2:
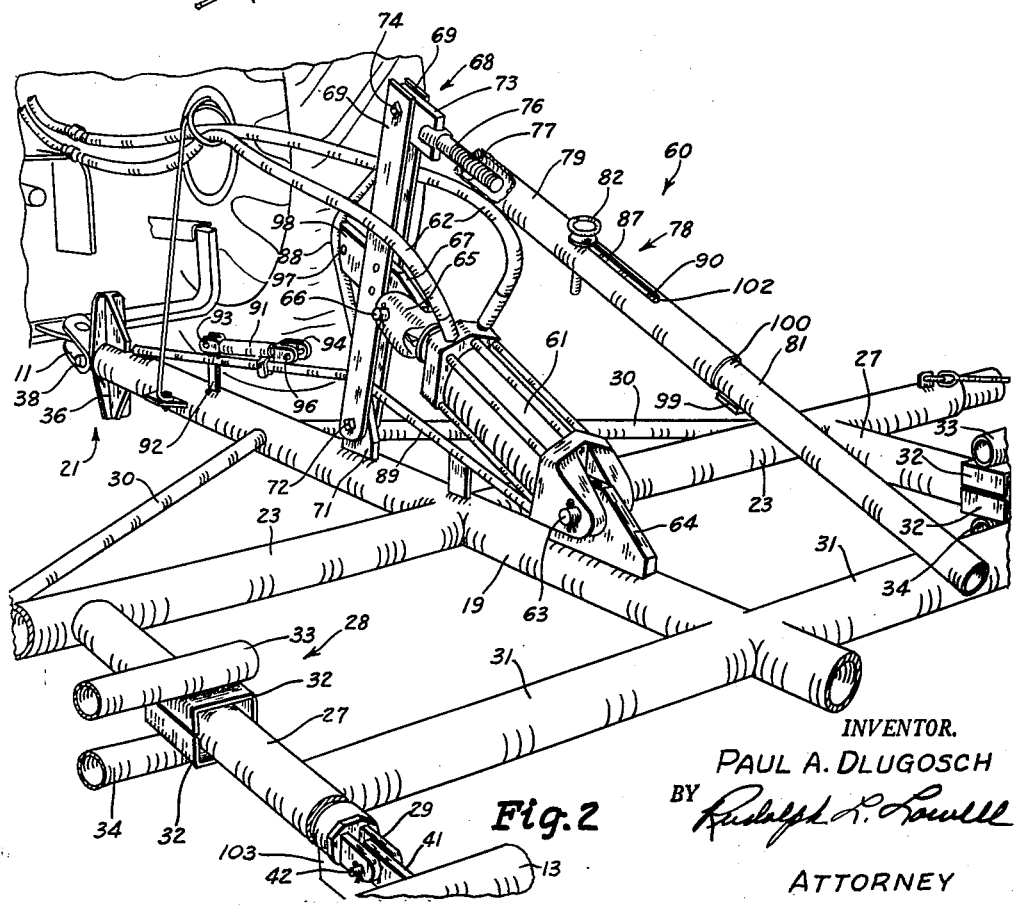
FIG. 2 is an enlarged fragmentary perspective view of a portion of the transport carrier of FIG. 1, wherein some parts are broken away in section for the purpose of clarity.

To attach a particular implement to be used to the carrier 10, the implement, such as the spike-tooth harrow shown herein, is attached to the drawbar 13, specially adapted to be used with either a spring or spike tooth harrow, or a rotary hoe. In turn, the drawbar 13 is removably connected to the transport carrier 10 by having three transversely spaced tongues 41 (FIG. 1) formed thereon, each of which is insertable within a respective yoke 22, 29, 29 and connected thereto by means of a connecting spin 42 (FIG. 2).

It may be noted in FIG. 1, that two center harrow sections 14 are connected to the drawbar 13 in a side-by-side relation. For drawing or pulling and lifting purposes, rearwardly extended riser arm members 43 are provided, each arm member being secured at one end by a clamping bracket 44 to the drawbar 13 and at the other end to a portion 45 of the harrow section 14, as by a chain and clamp unit 46. Another chain 47 is connected between a clamp 48 on the drawbar 13 and the forward end of another harrow section portion 49 for pulling purposes. The drawbar 13 is provided with a pivot 50 at each end thereof, whereby drawbar extensions 51 may be pivotally connected thereto in order to provide for the addition of an end harrow section 14 at each side of the two center sections 14. By this arrangement, it may be seen that four sections of harrow are placed in a side by side relation.

For pulling the end section, a pair of cables 52, 53 are provided for each section, one cable 52 being detachably connected between the front member 23 and a drawbar extension 51, and the other cable 53 connected to and secured between the extension 51 and a support device 54 mounted on an end portion of the center drawbar 13.

As presently described, the transport carrier 10 is connected in towed relation to the tractor 12 and in turn has detachably connected thereto a center drawbar 13 with extension drawbars 51 to which four sections of harrow 14 are removably secured in a ground engaging and working manner. Structure has been described wherein the transport carrier 10 may be vertically adjustably mounted on the wheel axles, by means of the axle support units 28, and wherein minor height adjustment may be made at the hitch support unit 21, both adjustments enabling the combined drawbars 13 and 51—51 to accommodate different implements and to provide proper draft. It has additionally be detailed that the center drawbar 13 is readily and quickly detachably connected to the transport carrier 10 by three connecting pins 42, each securing a drawbar tongue 41 to a connecting yoke 22 or 29—29 for pivotal movement therebetween; the outer extension drawbars 51 being detachably connected to the transport carrier 10 by means of a chain 52.

For the purpose of lifting the harrow sections 14 from a ground working position to either a field operating position or to a transport position, a hydraulic lift unit 60 (FIGS. 1 and 2) is provided.

The lift unit 60 is mounted on the transport carrier 10 and includes a piston and cylinder unit 61 (FIG. 2) to which hydraulic lines 62—62 are secured, the lines providing for the transmission of fluid between the unit 61 and the tractor hydraulic system. The unit 61 is pivotally mounted at one end by a pivot pin 63 to a mounting plate 64 which is secured to a rear portion of the center frame member 19. A piston 70 (FIG. 3) is extendable out of the other end of the unit 61 and has secured to the extended end a yoke 65 which is pivotally connected, as by a pivot pin 66, to a pivot plate 67.

The plate 67 is secured to the mid-section of a pivot unit 68 which comprises a pair of parallel transversely spaced pivot arms 69, pivotally connected at their lower ends to a mounting plate 71, as by a pivot pin 72, and also pivotally connected at their upper ends to a lug 73, as by a pivot bolt 74. The mounting plate 71 is secured to a forward portion of the center member 19. An externally threaded adjuster member 76 is permanently secured to the lug 73 for threaded insertion into a nut 77 which is part of a lift arm unit 78.

The lift arm unit 78 includes a tubular upper section or sleeve 79 and a tubular lower section or insert 81 interlockingly connected by a lift arm pin 82. The nut 77 is secured within the upper, forward end of the sleeve 79. The insert 81 is adapted to be telescopically movable within the confines of the tubular upper section 79. A transversely extended hinge bushing 83 (FIG. 1) is secured at the lower rear end of the insert 81 for pivotal connection, as by a hinge pin 84, to and between a pair of rock arms 86 permanently secured in transversely spaced relation to the mid-section of the center drawbar 13 so as to be axially aligned with the center member 19. By this mounting arrangement, the lift arm unit 78 extends substantially parallel to and directly over the piston and cylinder unit 61.

Figure 3:
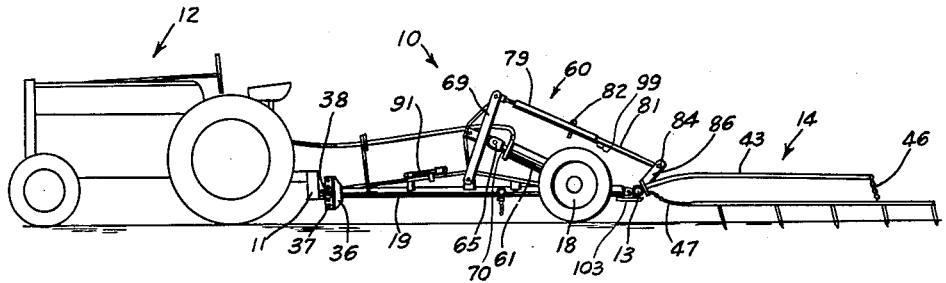
FIG. 3 is a reduced side elevational view of the tractor, the transport carrier, and the harrow arranged in a ground working position.

For the purpose of selectively providing either a forty-five degree or a ninety degree lift to the harrow sections 14, in either case as by a full stroke of the piston 70, an elongated slot 87 is formed in the upper and lower sides of the sleeve 79, the extent of which is determined by the distance between an upper hole (not shown) and a lower hole 90, each hole formed in a longitudinally spaced manner through the upper portion of the insert 81. The lift pin 82 is shown inserted through the upper hole in FIG. 2, wherein the tubular sections 79 and 81 and the piston and cylinder unit 61 are shown in their respective positions when the harrow sections 14 are in a ground engaging or working position (FIG. 3). In this position, the tubular sections 79 and 81 are prevented from further movement together, due to the pin 82 being at the upper extent of the slot and the lower end 100 of the tubular sleeve 79 being in an abutting relation with a stop plate 99 secured to the tubular insert 81.

A supporting rod 88 is secured about the outer end 98 of the pivot plate 67 and at its respective ends to the upper and lower portions respectively of the pivot unit 68. Another supporting rod 89 is secured to the mounting plate 71 and at its respective ends to a forward and a rear portion of the center member 19.

For a purpose hereinafter described, a tubular locking arm 91 is pivotally mounted at one end to a bar 92, as by a pivot pin 93, the bar 92 being mounted to a forward portion of the center member 19. A yoke 94 is secured at one end to a shaft 101 (FIG. 5) threadedly engaged in the free end of the locking arm 91, for pivotal connection, as by a pin 96, to the forward end 98 of the pivot plate 67, the pin 96 being insertable through an opening 97 formed therefor in the forward end 98.

Figure 4:
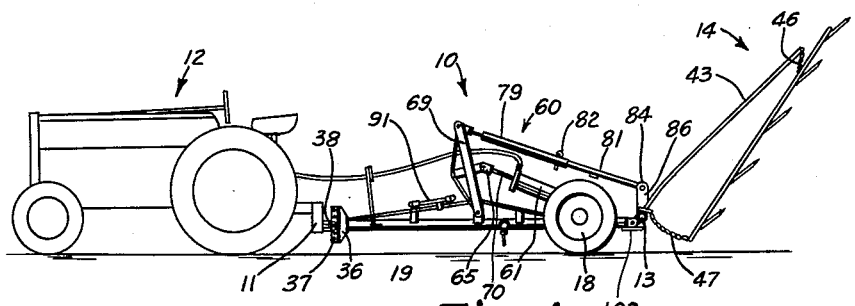
FIG. 4 is a duplicate view of FIG. 3, except wherein the transport carrier has been actuated to lift the harrow to an elevated position for field operations.

The operation of the hydraulic lift unit is quite simple. For ordinary field operations of the harrow sections 14 where it is necessary only to lift the sections about 45 degrees for the purposes of turning, crossing waterways, and clearing trash, the lift pin 82 is placed in the upper hole of the lower section 81 (FIGS. 2 and 3). Application of fluid from the tractor hydraulic system to the piston and cylinder unit 61 results in the piston 70 and the yoke 65 moving forwardly and upwardly a full stroke, whereby to rotate the pivot unit 68 about its pivot bolt 72 in a counterclockwise manner as indicated in FIG. 4.

As the lift pin 82 is in the upper hole, the sleeve 79 will be pulled forward a distance without moving the insert 81, whereby a lost motion occurs, until the lift pin 82 contacts the rear 102 of the slot 87. At this time, continued movement of the sleeve 79 causes the insert 81 to move forwardly a certain distance whereupon the rock arms 86 will be caused to pivot in a counterclockwise manner (FIG. 4) and thus pivot the drawbar 13 in the same direction. It may be seen that such rotation of the drawbar 13, and additionally of the extension drawbars 51, will cause the harrow sections 14 to be lifted above the surface of the ground at approximately a fourty-five degree angle by virtue of the arm members 43 and the chains 46. The chains 46 prevent the harrow sections from assuming a vertical position and thus dragging on the ground.

To lift the harrow sections to a ninety degree angle above the surface of the ground from the position of FIG. 3, the lift pin 82 is inserted in the lower hole 90 of the insert 81. Thus, upon a full stroke actuation of the piston and cylinder unit 61 to effect through the pivot unit 68 a forward upward movement of the sleeve 79, the lift pin will immediately be contacted by the rear 102 of the slot 87 whereby to cause the insert 81 to move upwardly the same distance as the sleeve 79, thus raising the insert 81 a distance approximately twice that as occurred when the lift pin 82 was inserted in the upper hole of the insert 81. Here again, a counterclockwise rotation of the rock arms 86 effects a counterclockwise rotation of the drawbar 13 and the extension drawbars 51 whereby to lift the harrow sections to approximately a ninety degree angle (FIG. 5).

Figure 5:
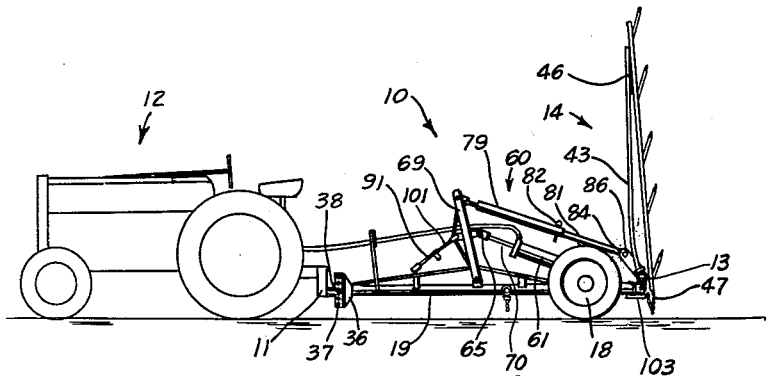
FIG. 5 is a duplicate view of FIG. 3, wherein the transport carrier has been actuated to lift the harrow to a transport position.

In the transport position of the harrow sections, as illustrated in FIG. 5, the lift unit 60 and thus the drawbars are locked in place, whereby to obviate any sagging due to possible inefficiency of the hydraulic system, by connecting the locking arm 91 to the forward end 98 of the pivot plate 67 in the manner indicated hereinbefore. Also at this time, the outer harrow sections 14 may be pivoted forwardly about the now vertical pivots 50 to a position wherein each section 14 rests upon the stop member 24. The outer sections 14 are then each secured to a stop member 24 by connecting the respective chain 26 about the harrow section 14 in a locking manner.

To return the harrow sections 14 to a ground working position, from the transport position of FIG. 5, the chains 26 are disconnected so that the outer harrow sections may be swung back to a side-by-side position in an alignment with the center sections, as determined by the full extent of the cables 52. The locking arm pin 96 is then withdrawn from engagement with the forward end 98 of the pivot plate 67, at which time the piston and cylinder unit 61 may be controlled to effect a gradual lowering of the harrow sections 14 by virtue of effecting a clockwise movement of the lift arms 69. When the harrow sections 14 have reached a ground engaging position, the pin 82 should be moved from the lower hole 90 position to the upper hole, thus readying the lift unit 60 for field operation. It may be noted here that when in a ground engaging position, the lift arm unit 78 is relieved of stress and strain from any tendency of the drawbar 13 to sag, due to the provision of supports 103 secured to the underneath of each side member 27 at the rear thereof on which supports 103 the drawbar 13 rests.

Although only one embodiment of the invention has been disclosed and described herein, it is to be noted that various modifications and alternate constructions may be made within the full intended scope of the invention as defined in the appended claim.

I claim:

A transport carrier for an earth working implement adapted to be connected in a towed relation with a tractor having a power unit, said transport carrier including a wheel supported frame having a longitudinally extended center member, a drawbar to which the implement is attachable in a trailing manner extended transversely of said frame and pivotally connected thereto and to the center member at the rear end thereof, rock arm means secured to said drawbar and in axial alignment with said center member, an elongated pivot unit pivotally mounted at one end to said center member and adapted to assume a generally upstanding position wherein the other end thereof is free, a fluid pressure type piston and cylinder unit pivotally mounted at one end to said center member rearwardly of said pivot unit connection and with the piston thereof extended upwardly and forwardly toward said tractor and pivotally connected to said pivot unit intermediate the ends thereof, and lift means secured at one end to said rock arm means and at the other end to said pivot unit free end whereby said lift means extend over and substantially parallel to said piston and cylinder unit, said lift means including a pair of telescopically connected outer and inner sections, said inner section having a pair of openings formed therein spaced longitudinally of said inner section, said outer section having an elongated slot formed therein registrable with said openings and of a length greater than the distance between said openings, and a pin insertable through said slot and either of said openings, whereby when said pin is inserted in one of said openings, upon a full power stroke of said piston the implement is raised above the surface of the ground at approximately a forty-five degree angle, and whereby when said pin is inserted in the other of said openings, upon a full power stroke of said piston the implement is raised above the surface of the ground at approximately a ninety degree angle, a stop plate secured to said inner section for engagement with an end of said outer section whereby to limit the movement together of said sections to prevent shearing said pin, and means mounted on said center member forwardly of said pivot unit connection for locking said pivot unit in an operative position thereof.

References Cited in the file of this patent

UNITED STATES PATENTS

| | | |
|---|---|---|
| 2,691,930 | Forgy | Oct. 19, 1954 |
| 2,704,018 | Oehler et al. | Mar. 15, 1955 |
| 2,718,184 | Morkoski | Sept. 20, 1955 |
| 2,750,724 | Stephenson | June 19, 1956 |
| 2,765,609 | Oehler et al. | Oct. 9, 1956 |

FOREIGN PATENTS

| | | |
|---|---|---|
| 906,280 | France | May 14, 1945 |